Patented Sept. 15, 1936

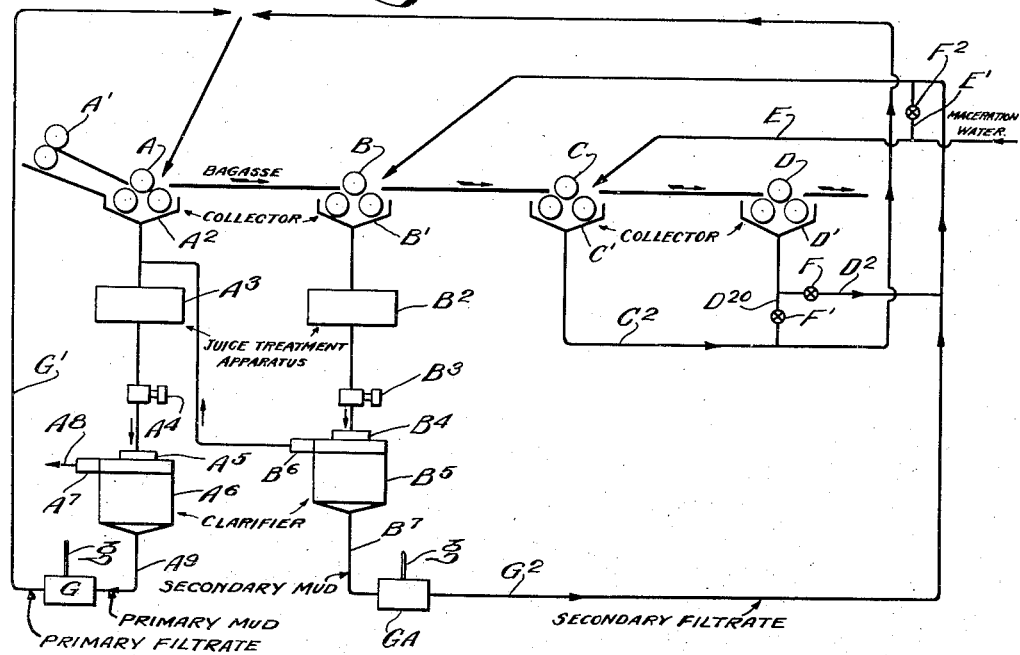
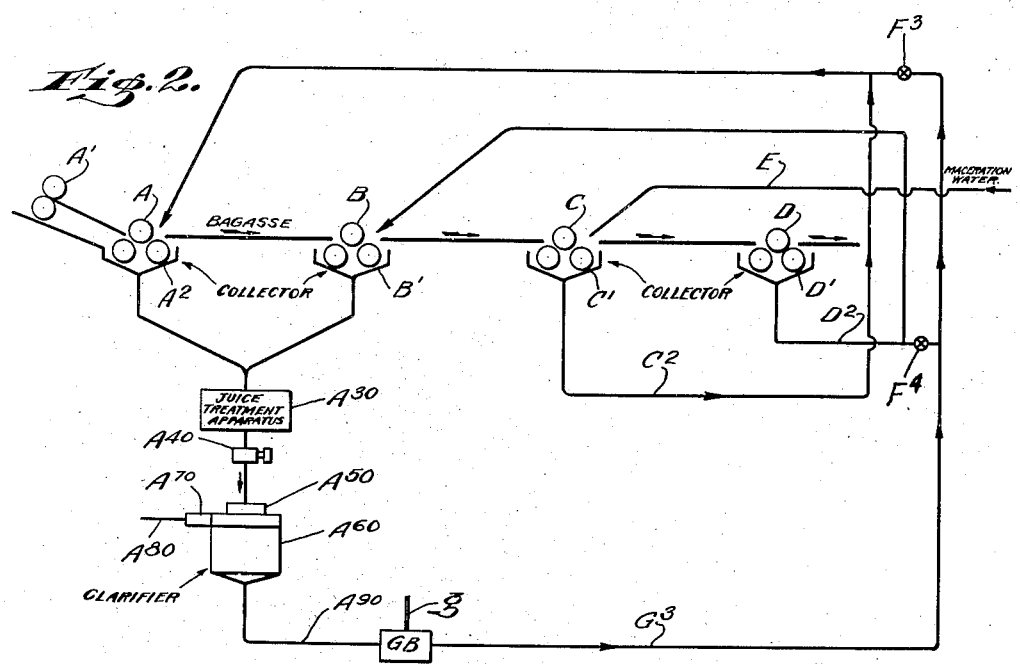

2,054,556

UNITED STATES PATENT OFFICE 2,054,556

SUGAR JUICE EXTRACTION AND CLARIFICATION

Earle M. Copp, San Juan, Puerto Rico, assignor to Petree & Dorr Engineers, Inc., New York, N. Y., a corporation of Cuba Application October 25, 1933, Serial No. 695,102

5 Claims. (Cl. 127—43)

The present invention relates to the extraction of sugar juice by a process which in most respects follows the usual practice of successively crushing and macerating the cane, collecting and defecating the resultant juices, and clarifying the defecated juices by sedimentation. The general method of procedure results in two main clarification products, namely, clear juice of sufficient purity for evaporation in the sugar house, and a residue commonly called "mud". The volume of the mud product of the sedimentation of defecated sugar juice varies between 5 and 30 per cent of the volume of the raw juice, with older methods of clarification the variation being from 10 to 30 per cent, and with the now well known Dorr clarifier the variation is ordinarily between 5 and 10 per cent.

The mud is a fluid mixture comprising juice and maceration water and solids in suspension. The solids comprise dirt carried into the grinding mills with the cane, fibrous material leaving the bagasse with the juices, gums and precipitates formed by the reaction of the chemicals used in the defecation process with organic salts in the cane. Some of the solids in the mud are in a colloidal state. The sugar content of the mud is sufficient to make its recovery highly important and heretofore various methods of recovering the sugar content of the mud have been used and proposed for use. In general the recovery of the sugar content from the mud has been effected in practice either by returning the mud to the bagasse in accordance with the well known Petree process, which in its original form is disclosed in Patent No. 1,266,882, and in a later form is disclosed in my prior Patent No. 1,824,875, granted September 29, 1931, or by subjecting the mud to a filtration or separation process carried on with ordinary filter press apparatus or with so-called continuous pressure or suction filters, which in some respects are more like mechanical strainers or separators than like ordinary filter presses.

The present invention relates particularly to a process of sugar juice extraction of the general type described above and of the particular form in which the sugar content is recovered from the mud product of the juice clarification by filtration, and the object of the invention is to improve the filtration procedure in respect to the manner of treating the filtrate leaving the filtering apparatus. The filtrate which contains the sugar content recovered in the filtration step is usually a quite low density juice because of the addition of water used in washing sugar out of the solid residue separated from the filtrate in the filtration process, and frequently contains sufficient solids, largely in a colloidal form, to make the filtrate cloudy and unsuitable for treatment in the evaporating apparatus without further clarification. This is particularly true with the filtrate obtained from continuous filters or strainers now in commercial use to some extent. The present invention is characterized by the use of the filtrate as maceration liquid added to the bagasse travelling through the milling circuit so that the sugar content in the filtrate is added to and ultimately recovered with the sugar content of the juices passing from the milling circuit to the clarifying apparatus and thence to the concentration apparatus. From the maceration standpoint, the low density of the filtrate is advantageous, so that the use of the present invention eliminates the incentive to use less wash water in the filtration process than is otherwise desirable.

My improved method may be carried out in various ways, and in particular may be used in treating all or a portion only of the mud separated from the clear juice produced by the clarification procedure employed, as plant conditions make desirable, and in the accompanying drawing and following descriptive matter I have illustrated and described, by way of example, some of the ways in which the general principles of the invention may be utilized.

Of the drawing:

Fig. 1 is a diagrammatic representation of a cane juice milling circuit and juice clarification system arranged for the use of one form of the present invention; and Fig. 2 is a diagrammatic representation of a system somewhat different from that shown in Fig. 1 in which another form of the present invention is utilized.

The apparatus diagrammatically shown in Fig. 1 includes a four mill crushing plant or milling circuit, comprising a primary mill A, a secondary mill B, and third and fourth mill C and D respectively. Sugar cane is passed from the crusher rolls A' through the various mills in the order mentioned. In the system illustrated, the rich juice is collected from the crusher and from the first mill by a collector $A^2$ from which it passes to a treatment apparatus $A^3$, where after straining, the juice is subjected to a chemical action or to a heating action, or preferably to both actions to coagulate albuminoids and to give proper acidity or alkalinity to the clear juice separated from the mud in the clarifier $A^6$, to which the juices are passed by a pump A⁴ through the inlet or feed chamber A⁵. The rich juice clarifier A⁶ may be a Dorr clarifier or of other suitable type, and is provided with a clear juice outlet or collector chamber A⁷ from which the clear juice passes away through the conduit A⁸ to the concentration apparatus. The mud separated from the juice in the clarifier A⁶ is passed from the bottom of the latter through a conduit A⁹.

The weaker juice received in the collector B' beneath the rolls of the secondary mill B passes to treatment apparatus B², and thence through a pump B³ to the feed chamber B⁴ of a clarifier B⁵ from which the mud separated from the juice is discharged through a conduit B⁷. The clear juice passes from the collecting or clear juice chamber or outlet B⁶ of the clarifier B⁵, and as shown, is passed into admixture with the rich juice passing from the collector A² to the treating apparatus A³. The parts B², B³, B⁴, B⁵ and B⁶ may be similar respectively to the parts A³, A⁴, A⁵, A⁶ and A⁷ of the apparatus shown in Fig. 1, and insofar as above described, the apparatus shown in Fig. 1, may be identical with the apparatus disclosed in my said prior Patent No. 1,824,875.

In the last mentioned patent the mud discharge conduits A⁹ and B⁷ pass the mud from the clarifiers A⁶ and B⁵, respectively, back onto the bagasse at suitable points in the path of the bagasse through the milling circuit without further treatment of the mud other than its dilution with maceration liquid. In accordance with the present invention, however, the mud from the clarifiers is not put back on the bagasse, but is passed to filtering apparatus in which all but a relatively minute portion of the solids in the mud are separated from the filtrates produced, and the latter are returned to the milling circuit and form a portion of the maceration liquid added to the bagasse.

In the form shown in Fig. 1, the filtering apparatus comprises a filter G receiving the mud passing from the primary clarifier A⁶ through the discharge conduit A⁹ and a separate filter GA for the mud passing through the conduit B⁷ from the secondary clarifier B⁵. The filter G has a filtrate outlet conduit G' and the filter GA has a filtrate outlet conduit G² through which the filtrates from the filters G and GA are passed onto the bagasse in the milling circuit. As shown in Fig. 1, the filtrate from the filter G is passed onto the bagasse in the milling circuit at the point at which the bagasse leaves the primary mill A, and the filtrate from the filter GA is discharged onto the bagasse as the latter leaves the secondary mill B. The filtrates thus passed onto the bagasse may be mixed with other maceration liquid. As shown, the filtrate from the filter G passing to the bagasse at the outlet from the primary mill A is mixed with the juice collected in the third mill collector C' and passed from the latter through the conduit C². As shown also, the juice collecting in the collector D' for the fourth mill, may pass through the conduit D² into admixture with the filtrate passing to the bagasse from the filter GA through the conduit G². Optionally, however, by closing a valve F in the conduit D² and opening a valve F' in the branch D²⁰ from the conduit D² connecting the latter at the inlet side of the valve F to the pipe C², the juice from the fourth mill as well as the juice from the third mill may be added to the filtrate from the filter G which is put on the bagasse as the latter leaves the primary mill A. In general, it is necessary to use some maceration water, and as shown the latter is supplied through a pipe E, which discharges onto the bagasse as the latter leaves the third mill C. By opening a valve F² in a branch pipe E' connecting the pipe E to pipe G², some of the maceration water employed, may be added to the filtrate passing from the filter GA to the pipe G².

As previously indicated, the filters G and GA may be of various forms and types. In general, the operation of each filter will require the use of more or less wash water for a suitable extraction of the sugar content from the filter cake or solid residue separated from the filtrate by the filter, and as shown each filter is provided with a wash water supply connection g. As previously indicated, the invention is of special utility in connection with filters of continuous pressure or suction or strainer separator types, because of the cloudiness of the filtrates from such filters, particularly under certain operating conditions, since the colloids which mainly serve to make such a filtrate cloudy are effectively eliminated by the subsequent treatment of the mixture of these filtrates with the raw cane juice and bagasse.

As already indicated, the general principles of the present invention are not restricted to use in the particular manner described above in connection with Fig. 1. Moreover, with the apparatus shown in Fig. 1, the mud from one only of the filters may be treated as described herein, and the mud from the other filter may be returned to the bagasse as in my prior Patent 1,824,875, or may be otherwise treated. Moreover, the invention may be used in systems of treating and clarifying sugar juice quite differently from the so-called double defecation system shown in Fig. 1. For example, as shown in Fig. 2, the invention may advantageously be used in connection with the apparatus in which the juices from the primary and secondary mill collectors A² and B' are combined and passed through a common defecation and clarifying system including a single treating apparatus A³⁰, a single pump A⁴⁰ and the inlet A⁵⁰ of a single juice clarifier A⁶⁰, which may or may not be like the previously described clarifiers A⁶ and B⁵. As shown the clarifier A⁶⁰ has a clear juice outlet or chamber A⁷⁰ from which the clear juice passes through a conduit A⁸⁰ to the concentration apparatus, and a mud outlet A⁹⁰. The latter passes the mud to a filter GB, which, as shown in Fig. 2, is connected into the maceration system so that the filtrate may be mixed with the juice passing from the third mill collector C' through the conduit C² to the bagasse leaving the primary mill A, or may be mixed with the juice passing from the collector D', of the fourth mill through the conduit D² to the bagasse leaving the secondary mill B, depending on the adjustment of valves F³ and F⁴, the valve F³ controlling communication between the pipes G³ and C², and the valve F⁴ controlling communication between the conduits G³ and D². By suitable adjustment of the valves F³ and F⁴, some of the filtrate may be mixed with the juice passing through the conduit C² and some with the juice passing through the conduit D². In Fig. 2, E represents a conduit for discharging maceration water onto the bagasse leaving the third mill C.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The method of extracting juice from sugar cane which comprises passing the cane through a milling circuit in which the cane is subjected to successive crushing actions, collecting and defecating juice crushed out of the cane in its passage through said circuit, separating clarified juice from the defecation mud without substantial dilution of the juice separated, filtering said mud and augmenting the filtrate thereby separated from the mud solids by adding water in the filtering process to wash sugar juice out of said solids, and macerating the cane passing through said circuit with liquid including the filtrate produced in so filtering said defecation mud.

2. The method of extracting juice from sugar cane which consists in passing the cane through a milling circuit in which the cane is subjected to successive crushing actions, separately collecting and defecating juice crushed out of the cane in its passage through an initial portion of said circuit, separating clarified juice from the defecation mud without substantial dilution of the juice separated, filtering the latter and augmenting the filtrate thereby separated from the mud solids by adding water in the filtering process to wash sugar juice out of said solids, and macerating the cane in its passage through said initial portion of said circuit with maceration liquid comprising the filtrate obtained in filtering said defecation mud.

3. The method of extracting juice from sugar cane which consists in passing the cane through a milling circuit in which the cane is subjected to successive crushing actions, collecting and defecating juices crushed out of the cane in its passage through an initial portion of said circuit, separating clarified juice from the defecation mud without substantial dilution of the juice separated, filtering the latter and augmenting the filtrate thereby separated from the mud solids by adding water in the filtering process to wash sugar juice out of said solids, collecting juice crushed out of the cane in a final portion of the milling circuit, and macerating the cane in its passage through said circuit with maceration liquid comprising the filtrate obtained in filtering said defecation mud and the last mentioned juice.

4. The method of extracting juice from sugar cane which comprises passing the cane through a milling circuit in which the cane is subjected to successive crushing actions, collecting, heating, and liming the juice crushed out of the cane in its passage through said circuit, separating said juice into clear juice, and defecating mud portions by settling and decantation without substantial dilution of the juice separated, filtering said mud and augmenting the filtrate thereby separated from the mud solids by adding water in the filtering process to wash sugar juice out of said solids, and macerating the cane passing through said circuit with liquid including the filtrate produced in so filtering said defecation mud.

5. The method of extracting juice from sugar cane, which comprises passing the cane through a milling circuit in which the cane is subjected to successive crushing actions, collecting, heating and liming the juice crushed out of the cane in its passage through said circuit, separating said juice into clear juice and defecating mud portions by settling and decantation without significant addition of water, filtering said mud portion by continuous filtration with the addition of wash water sufficient in amount to remove substantially all of the sugar juice from the mud solids separated from the filtrate formed and insufficient to provide an amount of filtrate equal to the amount of liquid desirably used in the milling circuit for maceration, and macerating the cane passing through an intermediate stage of the milling circuit with liquid including the filtrate supplied and macerating the cane passing through a final portion of the milling circuit with liquid consisting wholly or mainly of water supplied for the purpose.

EARLE M. COPP.